US010356084B2

(12) United States Patent
Mistry

(10) Patent No.: US 10,356,084 B2
(45) Date of Patent: *Jul. 16, 2019

(54) MOBILE DEVICE USING SHARED DIGITAL CERTIFICATE FOR DIFFERENT MANAGED ENTERPRISE APPLICATIONS AND RELATED METHODS

(71) Applicant: CITRIX SYSTEMS, INC., Fort Lauderdale, FL (US)

(72) Inventor: Shaunak Mistry, Scotts Valley, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,042

(22) Filed: Jun. 22, 2018

(65) Prior Publication Data
US 2018/0309751 A1    Oct. 25, 2018

Related U.S. Application Data

(63) Continuation of application No. 15/356,827, filed on Nov. 21, 2016, now Pat. No. 10,033,722.

(51) Int. Cl.
*H04L 29/06* (2006.01)
*H04L 9/08* (2006.01)
(Continued)

(52) U.S. Cl.
CPC .......... *H04L 63/0823* (2013.01); *G06F 21/33* (2013.01); *H04L 9/0825* (2013.01);
(Continued)

(58) Field of Classification Search
CPC . H04L 63/0823; H04L 9/0825; H04L 9/0894; H04L 9/3263; H04L 63/0442; G06F 21/33; G06F 21/53
See application file for complete search history.

(56) References Cited

U.S. PATENT DOCUMENTS 8,296,559 B2    10/2012  Parkinson
2011/0072270 A1*  3/2011  Little ...................... H04L 12/66
                                                  713/175
(Continued)

OTHER PUBLICATIONS

"PKCS—7" https://en.wikipedia.org/wiki/PKCS_-_7; Retrieved from internet Nov. 18, 2016; pp. 1. See Prioirty U.S. Appl. No. 15/356,827, filed Nov. 21, 2016.

*Primary Examiner* — Nelson Giddins
(74) *Attorney, Agent, or Firm* — Allen, Dyer, Doppelt + Gilchrist, PA

(57) ABSTRACT

A mobile device may include at least one memory and a processor-cooperating with the at least one memory to enroll with an enterprise mobility management (EMM) server and store a plurality of different managed enterprise applications in the at least one memory, and receive and store a digital certificate associated with a given one of the managed enterprise applications in a secure shared location within the at least one memory. The processor may further run the plurality of managed enterprise applications to share access to the digital certificate from the secure shared location and generate and send encrypted data to another mobile device via the EMM server with all of the managed enterprise applications using the same digital certificate associated with the given managed enterprise application for encryption so that the EMM server is unable to decrypt the encrypted data.

20 Claims, 8 Drawing Sheets

(51) Int. Cl.
*G06F 21/33* (2013.01)
*H04L 9/32* (2006.01)
*G06F 21/53* (2013.01)
*H04W 12/06* (2009.01)

(52) U.S. Cl.
CPC .......... *H04L 9/0894* (2013.01); *H04L 9/3263* (2013.01); *H04L 63/0442* (2013.01); *H04L 63/123* (2013.01); *H04W 12/06* (2013.01); *G06F 21/53* (2013.01); *H04L 9/088* (2013.01); *H04L 2209/80* (2013.01)

(56) References Cited

U.S. PATENT DOCUMENTS

| | | | |
|---|---|---|---|
| 2012/0137372 A1* | 5/2012 | Shin | H04L 9/088 726/26 |
| 2014/0258711 A1* | 9/2014 | Brannon | H04L 63/0823 713/156 |
| 2015/0244711 A1* | 8/2015 | Venkataraman | H04L 63/0823 713/156 |
| 2015/0379287 A1* | 12/2015 | Mathur | G06F 21/6209 726/27 |
| 2016/0254904 A1* | 9/2016 | Hjelm | H04L 9/006 713/155 |

\* cited by examiner

MOBILE DEVICE USING SHARED DIGITAL CERTIFICATE FOR DIFFERENT MANAGED ENTERPRISE APPLICATIONS AND RELATED METHODS

RELATED APPLICATIONS

This application is a continuation of U.S. application Ser. No. 15/356,827 filed Nov. 21, 2016, which is hereby incorporated herein in its entirety by reference.

TECHNICAL FIELD

This disclosure generally relates to mobile computing devices and, more particularly, to techniques for providing managed applications executing on mobile computing devices.

BACKGROUND

Some enterprises (e.g., corporations, partnerships, governments, academic institutions, other organizations, etc.) maintain enterprise computer networks that allow enterprise users, such as employees, access to enterprise resources, such as hardware and software applications for email, customer relationship management (CRM), document management, enterprise resource planning (ERP), and the like, as well as other data controlled by the enterprise. Enterprises sometimes allow remote access, such as when enterprise users are not in the enterprise network. Also, some enterprises allow users to access the enterprise network via mobile devices, such as smartphones, tablet computers, PDAs (personal digital assistant), and the like.

Enterprises typically deploy enterprise mobility management (EMM) solutions to assist in the management and control of remote access to enterprise resources. EMM solutions have traditionally taken the approach of managing entire mobile devices through what are known as mobile device management (MDM) approaches. In traditional EMM systems, enterprises typically issue mobile devices to employees, which are intended exclusively for business use, and the enterprise maintains control over the mobile devices and all of its applications and data. A recent trend is to allow employees to use their own mobile device(s) for work purposes (a scenario known as BYOD—bring your own device). However, BYOD scenarios pose inherent security risks, because there is neither uniform nor universal control over each device.

SUMMARY

A mobile device may include at least one memory and a processor cooperating with the at least one memory to enroll with an enterprise mobility management (EMM) server and store a plurality of different managed enterprise applications in the at least one memory, and receive and store a digital certificate associated with a given one of the managed enterprise applications in a secure shared location within the at least one memory. The processor may further run the plurality of managed enterprise applications to share access to the digital certificate from the secure shared location and generate and send encrypted data to another mobile device via the EMM server with all of the managed enterprise applications using the same digital certificate associated with the given managed enterprise application for encryption so that the EMM server is unable to decrypt the encrypted data.

By way of example, the plurality of managed enterprise applications may comprise a chat application to generate encrypted chat data, an electronic mail (email) application to generate encrypted email data, a video streaming application to generate encrypted video streaming data, etc. In one example embodiment, the plurality of managed enterprise applications may be stored in a secure container.

Also by way of example, the digital certificate may comprise at least one public key server (PKS) certificate. In accordance with another example, the digital certificate may comprise a Secure/Multipurpose Internet Mail Extensions (S/MIME) certificate.

The at least one memory and processor of the mobile device may further cooperate to receive and store the digital certificate via electronic mail delivery, for example. In accordance with another example, the at least one memory and processor of each mobile device further cooperate to receive and store the digital certificate as a derived credential. In still another example, a smart card may be associated with the mobile device, and the at least one memory and processor may further cooperate to receive and store the digital certificate via the smart card.

A related method may include enrolling a mobile device with an EMM server and storing a plurality of different managed enterprise applications in at least one memory of the mobile device, and receiving and storing a digital certificate associated with a given one of the managed enterprise applications in a secure shared location within the at least one memory. The method may further include running the plurality of managed enterprise applications to access the digital certificate from the secure shared location and generate and send encrypted data to another mobile device via the EMM server with all of the managed enterprise applications using the same digital certificate associated with the given managed enterprise application for encryption so that the EMM server is unable to decrypt the encrypted data.

A related non-transitory computer-readable medium may be for a mobile device including at least one memory and having computer executable instructions for causing the mobile device to perform steps including enrolling with an EMM server and storing a plurality of different managed enterprise applications in the at least one memory. The steps may further include receiving and storing a digital certificate associated with a given one of the managed enterprise applications in a secure shared location within the at least one memory, and running the plurality of managed enterprise applications to access the digital certificate from the secure shared location and generate and send encrypted data to another mobile device via the EMM server with all of the managed enterprise applications using the same digital certificate associated with the given managed enterprise application for encryption so that the EMM server is unable to decrypt the encrypted data.

DETAILED DESCRIPTION OF THE EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computer Architecture

Figure 1:
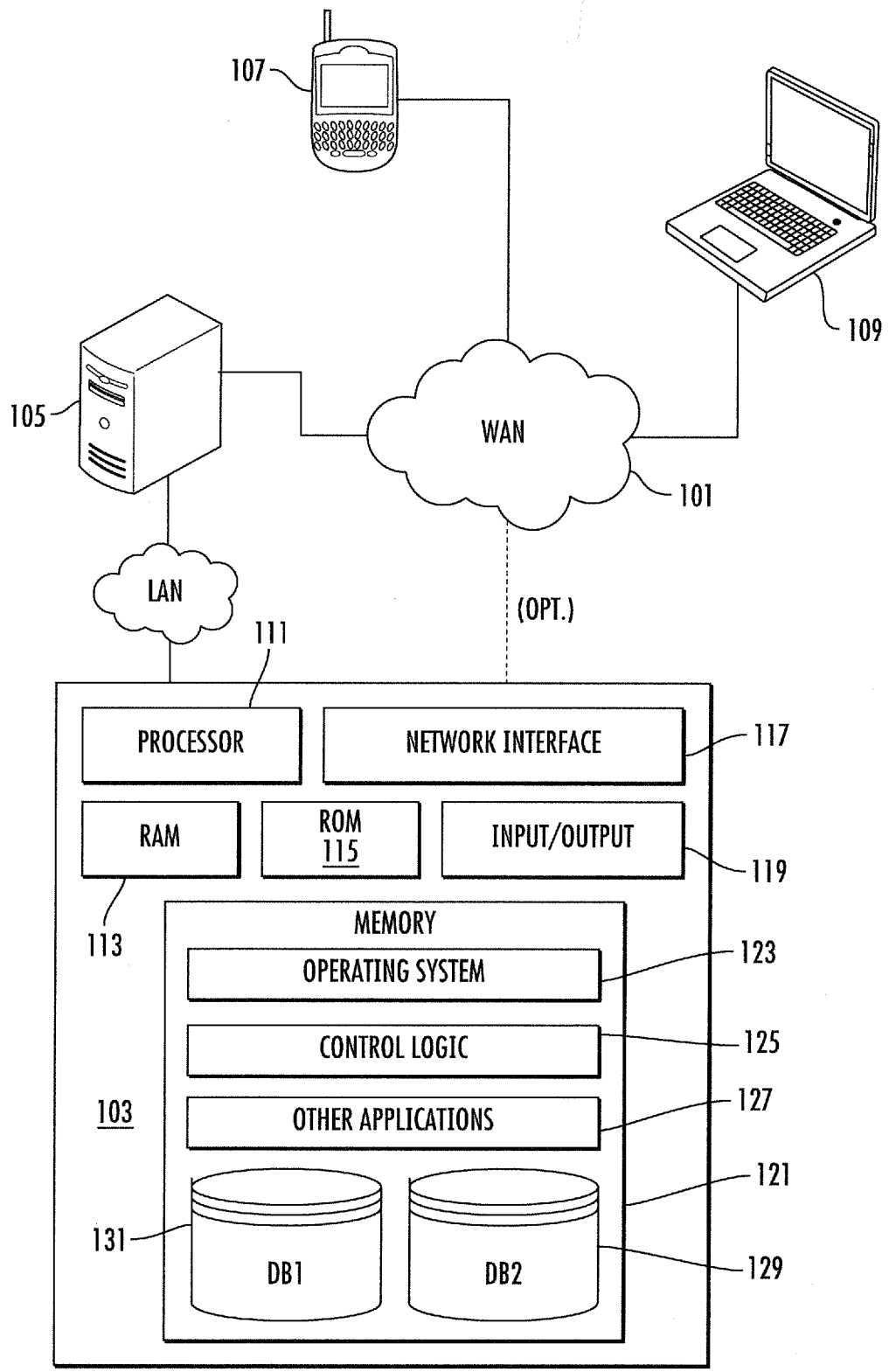
FIG. 1 is a schematic diagram of an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
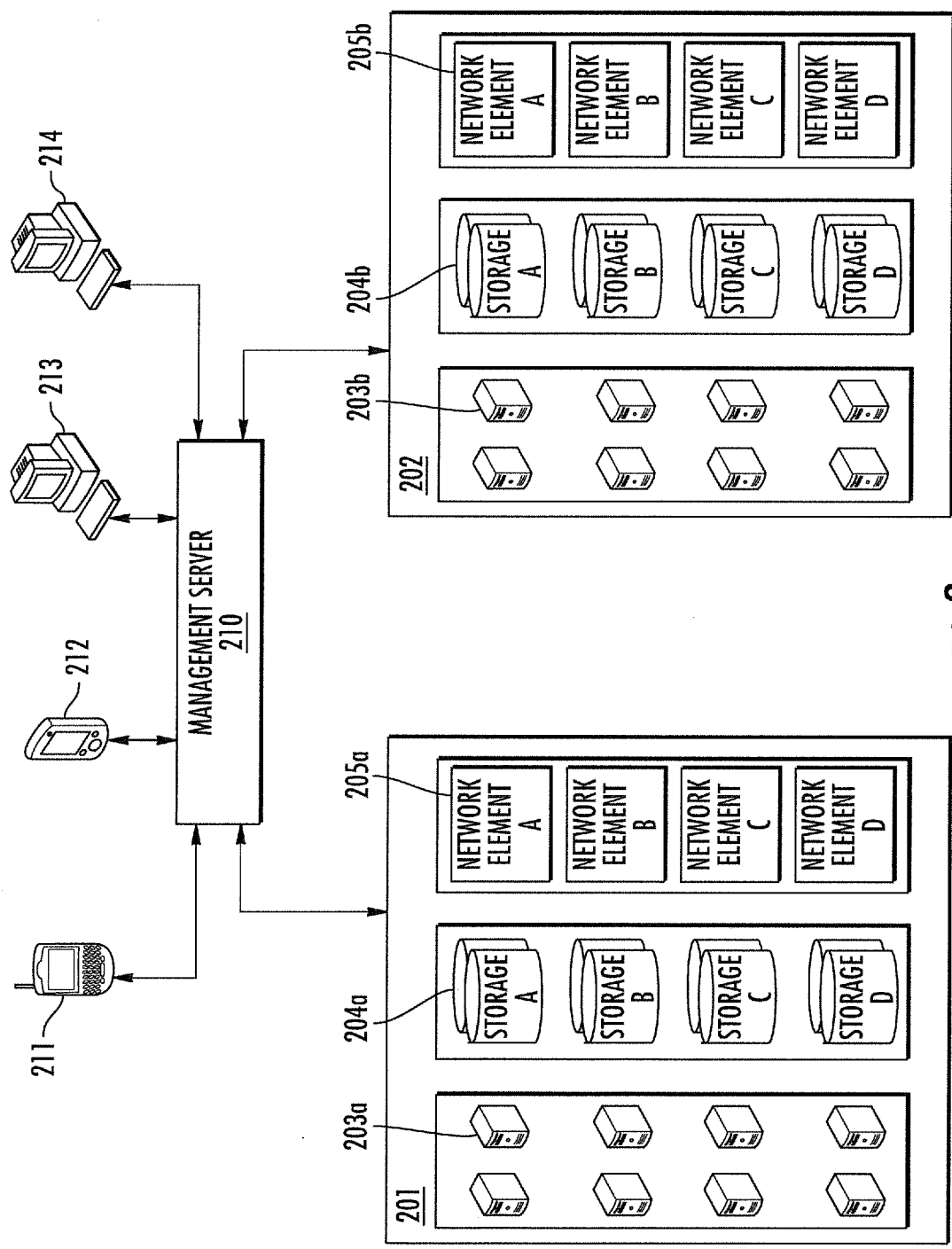
FIG. 2 is a schematic diagram of an illustrative cloud-based system architecture that may be used in accordance with one or more illustrative aspects described herein.

With further reference to FIG. 2, some aspects described herein may be implemented in a cloud-based environment. FIG. 2 illustrates an example of a cloud computing environment (or cloud system) 400. As seen in FIG. 2, client computers 211-214 may communicate with a cloud management server 210 to access the computing resources (e.g., host servers 203, storage resources 204, and network resources 205) of the cloud system.

Management server 210 may be implemented on one or more physical servers. The management server 210 may run, for example, a cloud infrastructure management system based on the CLOUDSTACK or OPENSTACK platforms, among others. Management server 210 may manage various computing resources, including cloud hardware and software resources, for example, host computers 203, data storage devices 204, and networking devices 205. The cloud hardware and software resources may include private and/or public components. For example, a cloud may be configured as a private cloud to be used by one or more particular customers or client computers 211-214 and/or over a private network. In other embodiments, public clouds or hybrid public-private clouds may be used by other customers over an open or hybrid networks.

Management server 210 may be configured to provide user interfaces through which cloud operators and cloud customers may interact with the cloud system. For example, the management server 210 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 210 also may include a set of APIs and/or one or more customer console applications with user interfaces configured to receive cloud computing requests from end users via client computers 211-214, for example, requests to create, modify, or destroy virtual machines within the cloud. Client computers 211-214 may connect to management server 210 via the Internet or other communication network, and may request access to one or more of the computing resources managed by management server 210. In response to client requests, the management server 210 may include a resource manager configured to select and provision physical resources in the hardware layer of the cloud system based on the client requests. For example, the management server 210 and additional components of the cloud system may be configured to provision, create, and manage virtual machines and their operating environments (e.g., hypervisors, storage resources, services offered by the network elements, etc.) for customers at client computers 211-214, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 211-214 may be related, for example, different client computers creating virtual machines on behalf of the same end user, or different users affiliated with the same company or organization. In other examples, certain clients 211-214 may be unrelated, such as users affiliated with different companies or organizations. For unrelated clients, information on the virtual machines or storage of any one user may be hidden from other users.

Referring now to the physical hardware layer of a cloud computing environment, availability zones 201-202 (or zones) may refer to a collocated set of physical computing resources. Zones may be geographically separated from other zones in the overall cloud of computing resources. For example, zone 201 may be a first cloud datacenter located in California, and zone 202 may be a second cloud datacenter located in Florida. Management sever 210 may be located at one of the availability zones, or at a separate location. Each zone may include an internal network that interfaces with devices that are outside of the zone, such as the management server 210, through a gateway. End users of the cloud (e.g., clients 211-214) might or might not be aware of the distinctions between zones. For example, an end user may request the creation of a virtual machine having a specified amount of memory, processing power, and network capabilities. The management server 210 may respond to the user's request and may allocate the resources to create the virtual machine without the user knowing whether the virtual machine was created using resources from zone 201 or zone 202. In other examples, the cloud system may allow end users to request that virtual machines (or other cloud resources) are allocated in a specific zone or on specific resources 203-205 within a zone.

In this example, each zone 201-202 may include an arrangement of various physical hardware components (or computing resources) 203-205, for example, physical hosting resources (or processing resources), physical network resources, physical storage resources, switches, and additional hardware resources that may be used to provide cloud computing services to customers. The physical hosting resources in a cloud zone 201-202 may include one or more computer servers 203, such as virtualization servers, which may be configured to create and host virtual machine instances. The physical network resources in a cloud zone 201 or 202 may include one or more network elements 205 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 201-202 may include storage disks (e.g., solid state drives (SSDs), magnetic hard disks, etc.) and other storage devices.

The example cloud computing environment shown in FIG. 2 also may include a virtualization layer with additional hardware and/or software resources configured to create and manage virtual machines and provide other services to customers using the physical resources in the cloud. The virtualization layer may include one or more hypervisors, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 203 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 3:
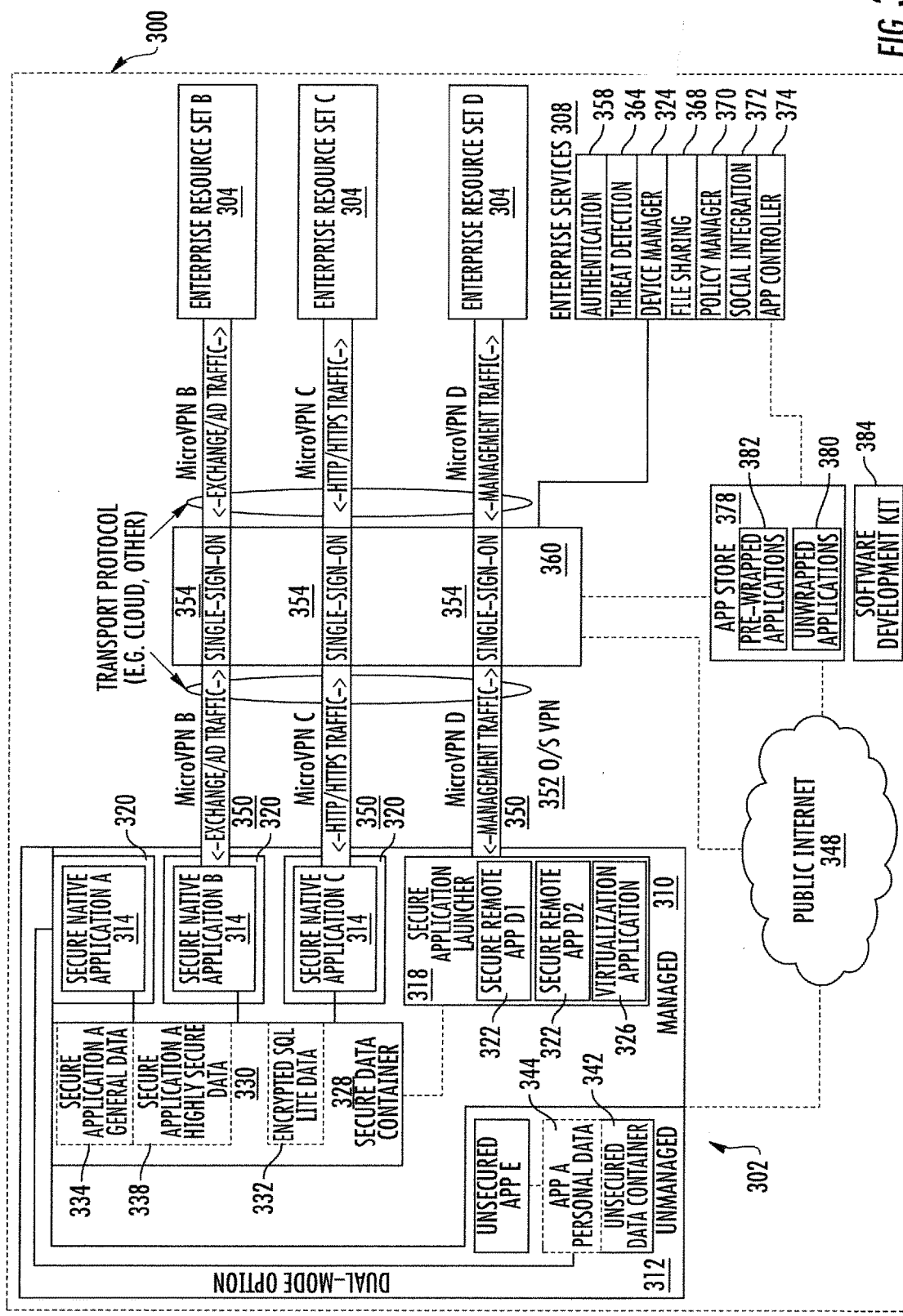
FIG. 3 is a schematic diagram of an illustrative enterprise mobility management system.

FIG. 3 represents an enterprise mobility technical architecture 300 for use in an enterprise environment, a BYOD environment, or other mobile environments. The architecture enables a user of a mobile device 302 (e.g., as client 107, 211, or otherwise) to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to the user. The user may utilize the mobile device 302 for business use only or for business and personal use. The mobile device may run an iOS operating system, Android operating system, and/or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device or managed device.

In some embodiments, the operating system of the mobile device may be separated into a managed partition 310 and an unmanaged partition 312. The managed partition 310 may have policies applied to it to secure the applications running on and data stored in the managed partition. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server.

In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record/pass-through user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure managed applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as AES 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured mode. In an unsecured mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections (also referred to as microVPN or application-specific VPN) may be specific to particular applications 350, particular devices, particular secured areas on the mobile device, and the like (e.g., 352). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers; and the like. File sharing servers may include SHAREFILE servers, other file sharing services, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store/distribution portal 378. The application store 378 may include unwrapped applications 380, pre-wrapped applications 382, and the like. Applications may be populated in the application store 378 from the application controller 374, e.g., by an administrator responsible for app prep, app publishing, app updates, role assignment, and/or policy definition and selection, among other functions. The application store 378 may be accessed by the mobile device 302 through the access gateway 360, through the public Internet 348 (optionally through a secure firewall), or the like. The application store may be provided with an intuitive and easy to use user interface. The application store 378 may provide access to a software development kit/self-installation kit 384. The software development kit 384 may provide a user the capability to secure unmanaged applications selected by the user by wrapping the application as described herein. An application that has been wrapped using the software development kit 384 may then be made available to the mobile device 302, e.g., by installing the wrapped version of the app, by sending the application store 378 for approval, and/or by directly populating it in the application store 378 using the application controller 374.

The enterprise mobility technical architecture 300 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
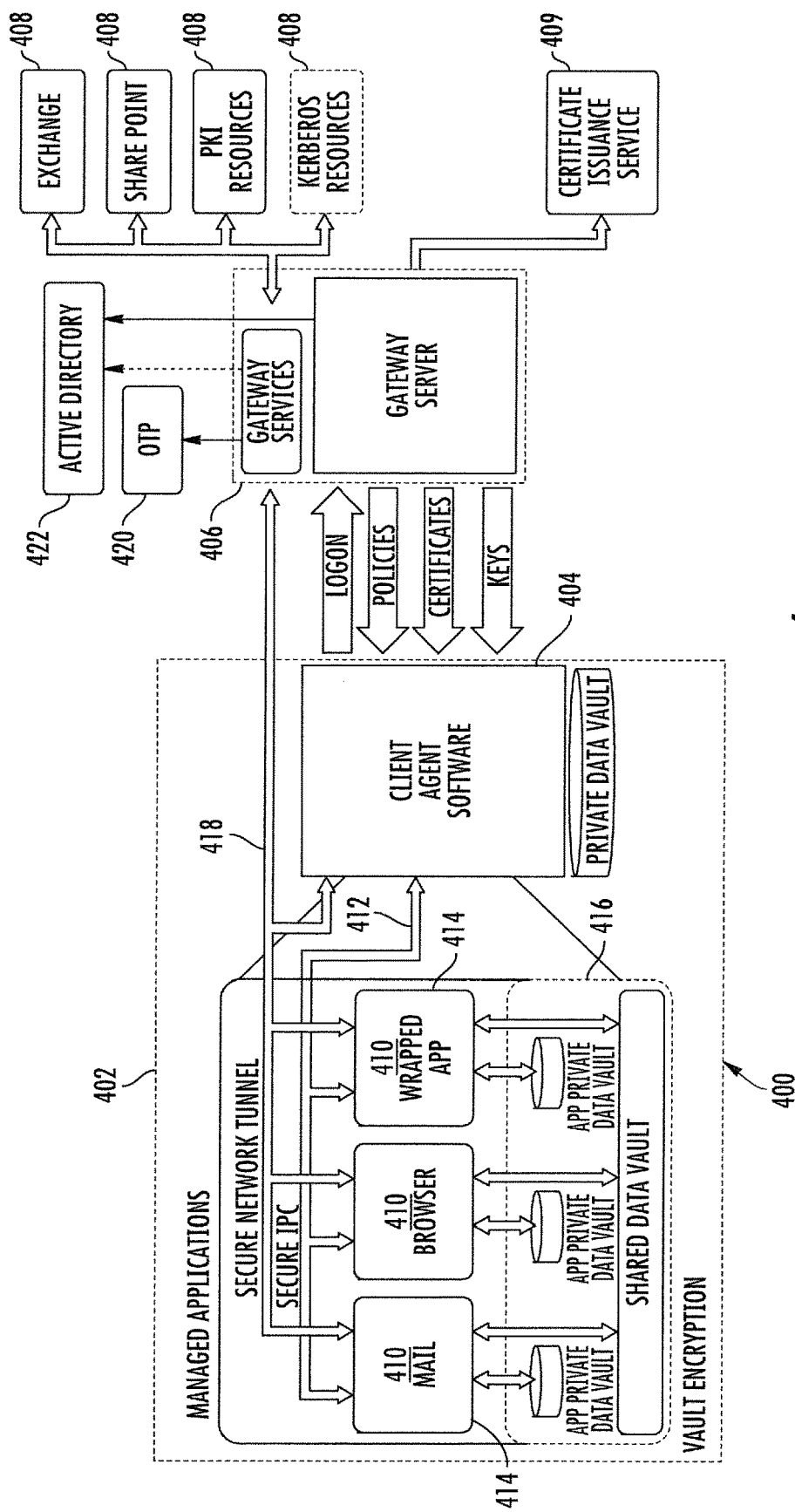
FIG. 4 is a schematic diagram of another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled/managed mobile device 402 (e.g., client 107, 212, 302, etc.) with a client agent 404, which interacts with gateway server 406 (which includes access gateway and application controller functionality) to access various enterprise resources 408 and services 409 such as Exchange, Sharepoint, PKI Resources, Kerberos Resources, and Certificate Issuance Service, as shown on the right hand side above. Although not specifically shown, the mobile device 402 may also interact with an enterprise application store (e.g., an app store, storefront, or the like) for the selection and downloading of applications.

The client agent 404 acts as the UI (user interface) intermediary for Windows apps/desktops hosted in an Enterprise data center, which are accessed using the HDX/ICA display remoting protocol, or any other remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and an application management framework, such as MDX (mobile experience technology) by Citrix Systems Inc. of Fort Lauderdale, Fla. (other application management frameworks may also be used), act to provide policy driven management capabilities and features such as connectivity and SSO (single sign on) to enterprise resources/services 408. The client agent 404 handles primary user authentication to the enterprise, normally to the access gateway (AG) with SSO to other gateway server components. The client agent 404 obtains policies from gateway server 406 to control the behavior of the managed applications 410 on the mobile device 402. As used herein, a managed application is one that is capable of being controlled based on and operated in accordance with independently defined and communicated policy files.

The secure IPC links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 614 on first launch of an application 410 to initialize the secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through access gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The mail and browser managed applications 410 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 406 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password (or other security key, e.g., biometric, etc.). When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known.

Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated. Data leakage from application management framework 414 may be prevented in other ways. For example, when an application 410 is put in the background, the memory may be cleared after a predetermined (configurable) time period. When backgrounded, a snapshot may be taken of the last displayed screen of the application to expedite the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password (or biometric authentication) may be implemented for offline authentication for those applications 410 for which offline use is permitted via enterprise policy. For example, an enterprise may want the enterprise application store to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified. Biometric authentication may also or alternatively be used for one or both of offline authentication as well as a source of entropy for key derivation functions.

Another feature relates to the enablement of a client side certificate for certain applications 410 as secondary credentials (for the purpose of accessing PKI protected web resources via the application management framework micro VPN feature). For example, an application such as a corporate email application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an enterprise special purpose web service to support the issuance of client certificates to allow relevant managed applications to authenticate to internal PKI protected resources. Alternatively, client certificates may be issued by access gateway 360. In another example, client certificates may be provided by an EMM/MRM server (e.g., at the device level), and/or by an app controller that provisions certificates based on application-level policies.

The client agent 404 and application management framework 414 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for application management framework to mediate HTTPS requests).

Application management framework client certificate support on iOS may rely on importing a PKCS 12 BLOB (Binary Large Object) into the iOS keychain (or other container managed secrets vault protected by password, biometric validation, or other credentials) in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to AD 422, using an AD password or trusted client certificate, and obtain Kerberos service tickets to respond to HTTP negotiate authentication challenges. The limited support feature relates to constrained delegation in the access gateway software, where the software supports invoking Kerberos protocol transition so it can obtain and use Kerberos service tickets (subject to constrained delegation) in response to HTTP negotiate authentication challenges. This mechanism works in reverse web proxy mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of the enterprise application store and application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Figure 5:
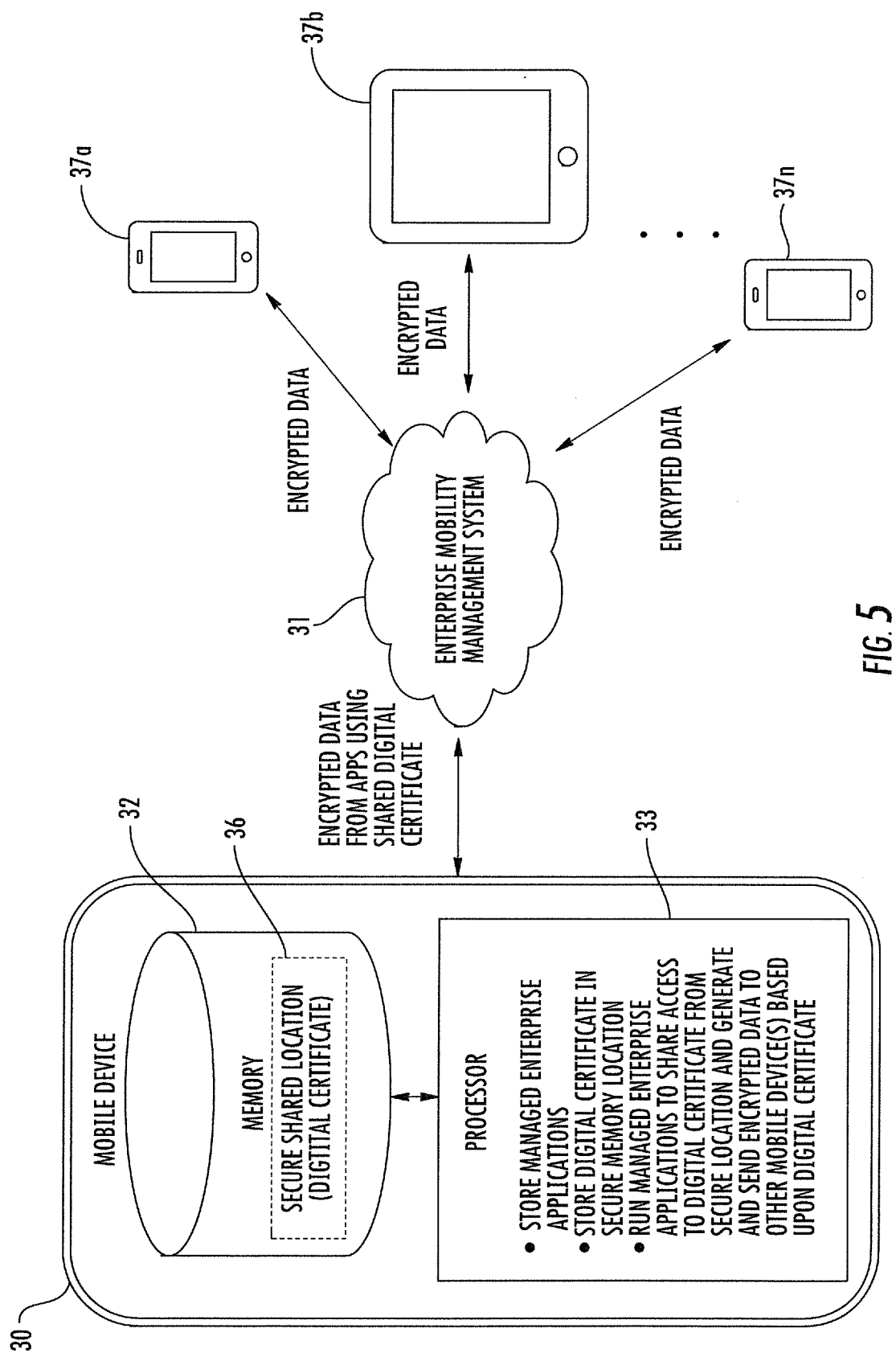
FIG. 5 is a schematic block diagram of an enterprise mobility management system which provides digital certificate sharing for managed applications.

Other features may also be controlled, managed, enabled, disabled, locked, unlocked, blocked, unblocked, or otherwise modified based on policy, user information, or other security information. A non-exhaustive list of features includes printing, data backup, location services, camera access, microphone access, data port access, access to removable storage, URL and other inter-app dispatching, access to other mobile device hardware such as biometric devices, accelerometers, proximity sensors, NFC, etc., and access to other system services such as sending SMS messages, sending email messages, network access, and the like.
Managed Application Digital Certificate Sharing Turning to FIGS. 5-7, an example mobile device 30 for use with an enterprise mobility management EMM server or service 31 is now described. As discussed above, the mobile device 30 may be a smart phone, tablet computer, laptop computer, etc., and it illustratively includes one or more memories 32 and a processor 33. The processor 33 may be implemented using appropriate hardware (e.g., microprocessors, etc.) and non-transitory computer-readable medium components as described further above. Beginning at Block 61 of the flow diagram 60 of FIG. 6, when the mobile device 30 is enrolled with the EMM server or service 31, a plurality of managed applications 34a-34c are installed in a secure container 35 within the memory 32, at Block 62, as discussed above. In the example illustrated in FIG. 7, the managed applications include a video streaming application 34a (e.g., a video chat application), an email application 34b, and a text chat application 34c, although other managed applications may also be used in different embodiments.

By way of background, there are certain challenges that need to be solved to deliver end-to-end encrypted chat messages within an EMM environment. One challenge is the appropriate encryption to be used so that the chat messages are delivered transparent to (i.e., are unreadable by) the EMM server 31 (or cloud service). This implies that although a chat server is used to store and forward messages between two or more end devices, the chat server cannot decrypt the actual message. Another challenge is that mobile device users expect applications to be easy to use: intuitive, highly interactive and always available. However, delivery of a unique set of encryption certificates for one or more chat applications may be obtrusive to users, and may also require a special lifecycle management for the new set of certificates.

Figure 6:
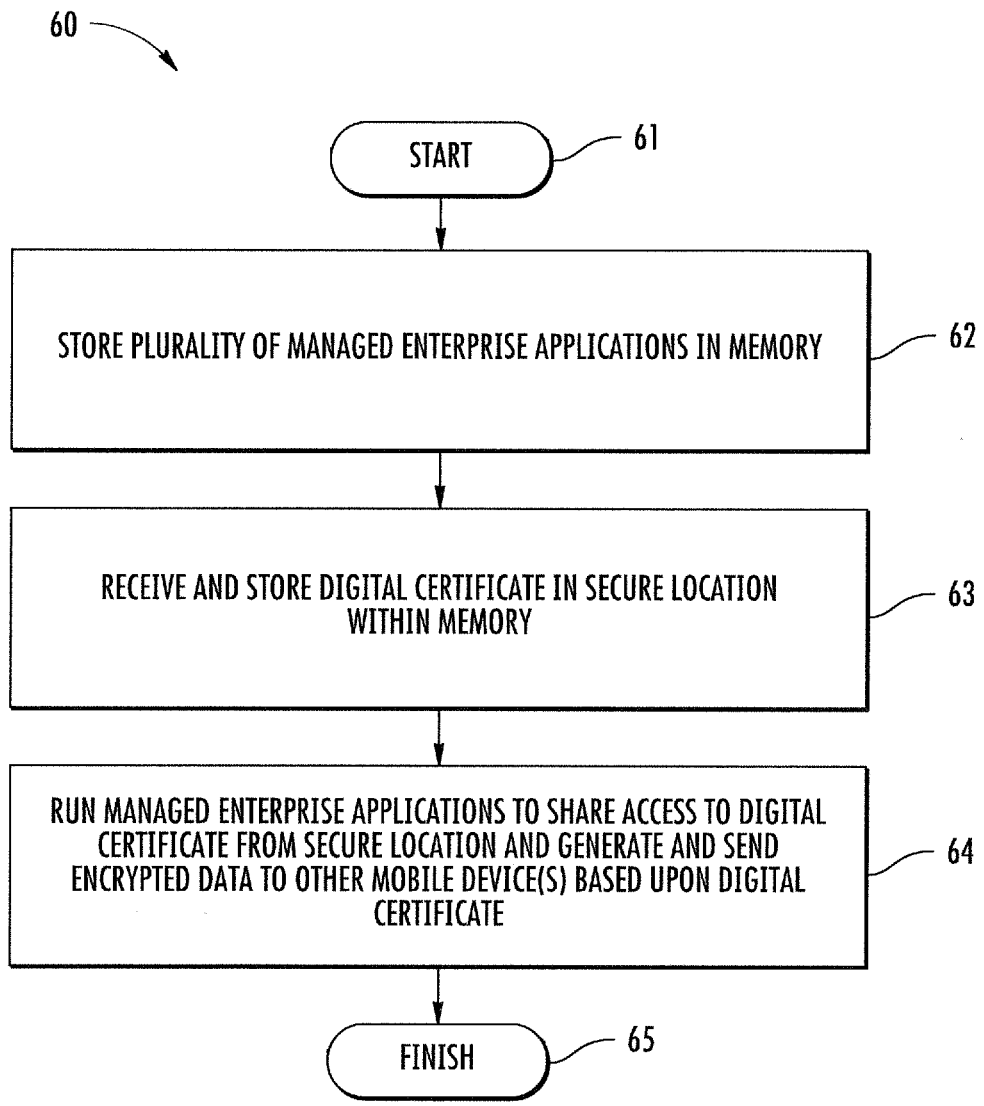
FIG. 6 is a flow diagram illustrating method aspects associated with the system of FIG. 5.
Figure 7:
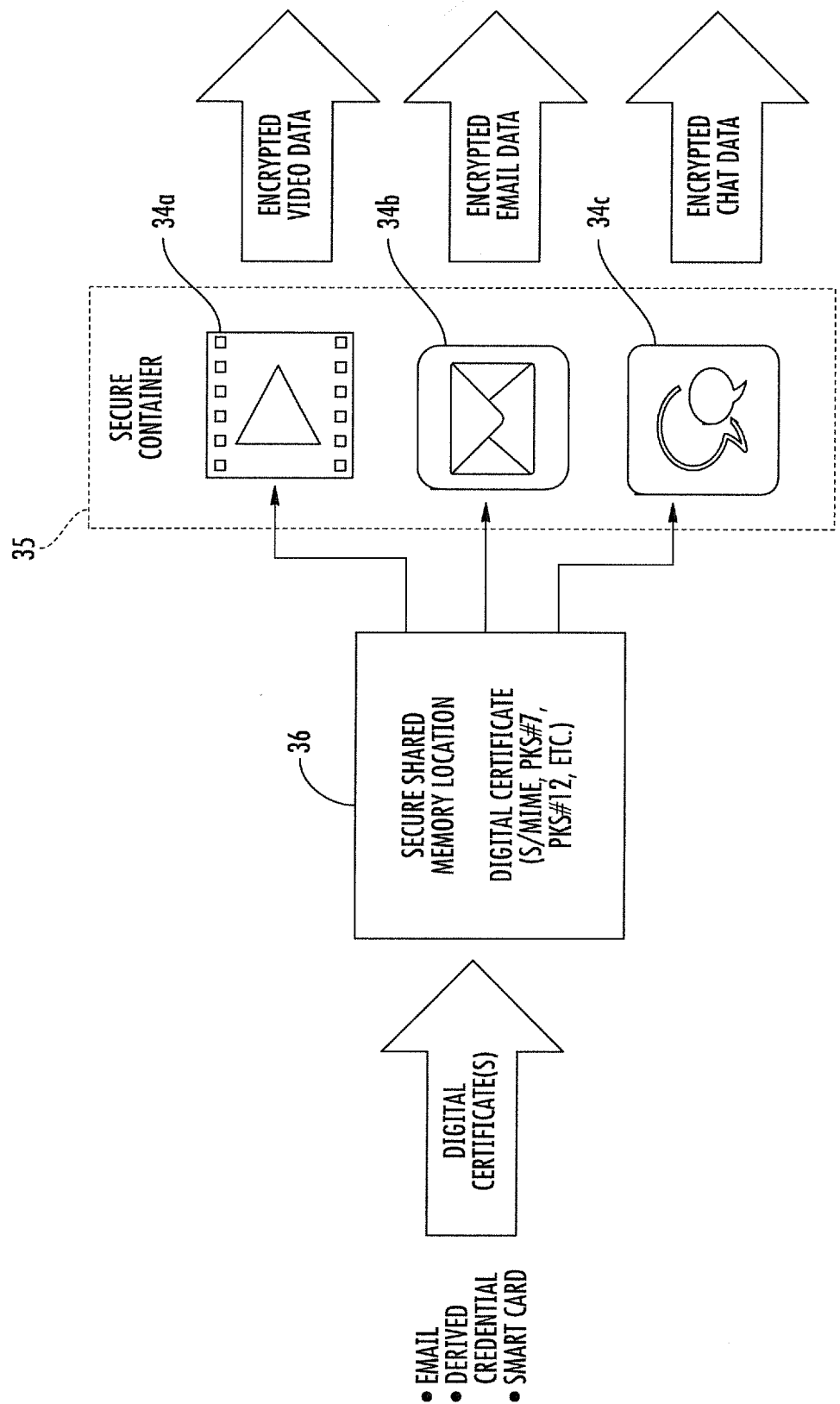
FIG. 7 is a schematic block diagram of an example implementation of a mobile device of the system of FIG. 5.

To overcome these technical challenges, the processor 33 may advantageously store one or more digital certificates in a secure shared location 36 within the memory 32, at Block 63, and run the plurality of managed enterprise applications or apps 34a-34c to access the digital certificate(s) from the secure shared location and generate and send encrypted data to one or more other EMM enrolled mobile devices 37a-37n (or other enrolled computing devices) based upon the digital certificate(s), at Block 64, which illustratively concludes the method of FIG. 6 (Block 65). Stated alternatively, the managed apps 34a-34c may all advantageously use the same digital certificate(s) to enable encryption of their respective types of communications for sending to other mobile devices 37a-37n in a form that is opaque to the rest of the EMM server or system 31.

The foregoing will be further understood with reference to an example implementation in which public key server (PKS) certificates (e.g., PKS #7 or PKS #12 certificates) are used to enable secure end-to-end chat message encryption, which may be delivered to the devices 37a-37n using an existing Secure/Multipurpose Internet Mail Extensions (S/MIME) infrastructure. More particularly, this approach may use the same S/MIME certificates provided for use with the email app 34b to also provide an asynchronous encryption mechanism for use by the other managed apps 34a, 34c in the secure container 35.

One example system in which the above-described approach may implemented is XENMOBILE from Applicant Citrix Systems, Inc. In XENMOBILE, an Enrollment app and a WorxMail app are provided on a mobile device installation, which may be used as a delivery mechanism, and single sign-on (SSO) adds to the usability. That is, XENMOBILE advantageously provides the ability to deliver S/MIME certificates to the mobile and desktop device, and the above-described approach may leverage these delivery mechanisms for delivering the certificates to the device. Moreover, XENMOBILE also provides the ability to securely share the public key infrastructure (PKI) certificates and other secure assets across apps on mobile iOS and Android devices, so the mail app 34b (e.g., WorxMail, Exchange), video chat app 34a (e.g., Skype) and text chat app 34c (e.g., WorxChat) may accordingly use the same certificates for enabling encryption of their respective communications. However, the techniques described herein may be implemented in other EMM systems and with other managed apps as well in different embodiments.

In the present example, PKI certificates are used to provide end-to-end transparent encryption while using the existing distribution method of S/MIME PKI certificates to provide this encryption. Moreover, the same S/MIME certificates used with the mail app 34b are shared with the other managed apps 34a, 34c, easing the delivery and life cycle management of these PKI certificates.

The secure end-to-end encryption may be achieved using PKS #7 or PKS #12 based PKI certificates as follows. A PKS #7 certificate for a particular user that includes three parts, which are:

a) The signing certificate that is used to verify the identity of the certificate owner. It may be assumed valid, and a device upon being challenged presents an accessible signed certificate that the device is a valid end point for the certificate owner. The signing certificate may be provided during the EMM enrollment process or delivered by an EMM enrollment agent.

b) A public encryption key, which may be freely shared by the recipient desirous of receiving encrypted chat messages, and it is used by a sender to encrypt messages to the receiver. This public key forms a key pair with the private key described below.

c) A private decryption key that is kept secret and NOT shared by the recipient which completes the key pair with the public key described above. This key is stored on the mobile device and is needed to decrypt messages encrypted with the corresponding public key.

In accordance with the present example, when a particular user sets up or enrolls a new device, the user uses a supported methods to receive the PKI for the mail app 34b, for example. The S/MIME certificates may be delivered to the device using one the following methods:

a) Email delivery of the SMIME certificates. The signing certificate and the encryption certificate are delivered via email to the mobile device 30. The certificates form an attachment to the email received on the device. When the attachment is downloaded the certificates are moved to the shared encrypted location 36 so that they may now be shared between the mail app 34b and chat apps 34a, 34c.

b) Derived Credentials. This approach allows for the credentials to be generated or delivered to the mobile device 30 in strict accordance to the NIST DC LOC 3 specifications. Once they are available on the device, the credentials are stored in the same secure shared location or encrypted vault 36 in the memory 32. Here, the derived credentials may be available on the mobile device 30 during enrollment, in which case they are delivered via the enrollment app (e.g., WorxHome in XENMOBILE). The derived credentials may also be delivered post enrollment via the mail app 34*b* (e.g., the WorxMail app in XENMOBILE).

c) Smart card access. The certificates may reside on an attached smart card, and the smart card access is required to access the S/MIME private decryption certificate and the signing validation certificate. In this case, the private decryption certificate and the signing certificate are not permanently downloaded to the mobile device 30, but instead may be imported to the secure shared location 36 (e.g., a secure buffer) for use by each of the managed apps 34*a*-34*c* as needed. Sharing of the S/MIME credential allows for users to also use their pre-existing SMIME email cards for secure end-to-end encrypted chat. In the XENMOBILE context, the WorxChat app would directly use the S/MIME certificates from the smart card.

Figure 8:
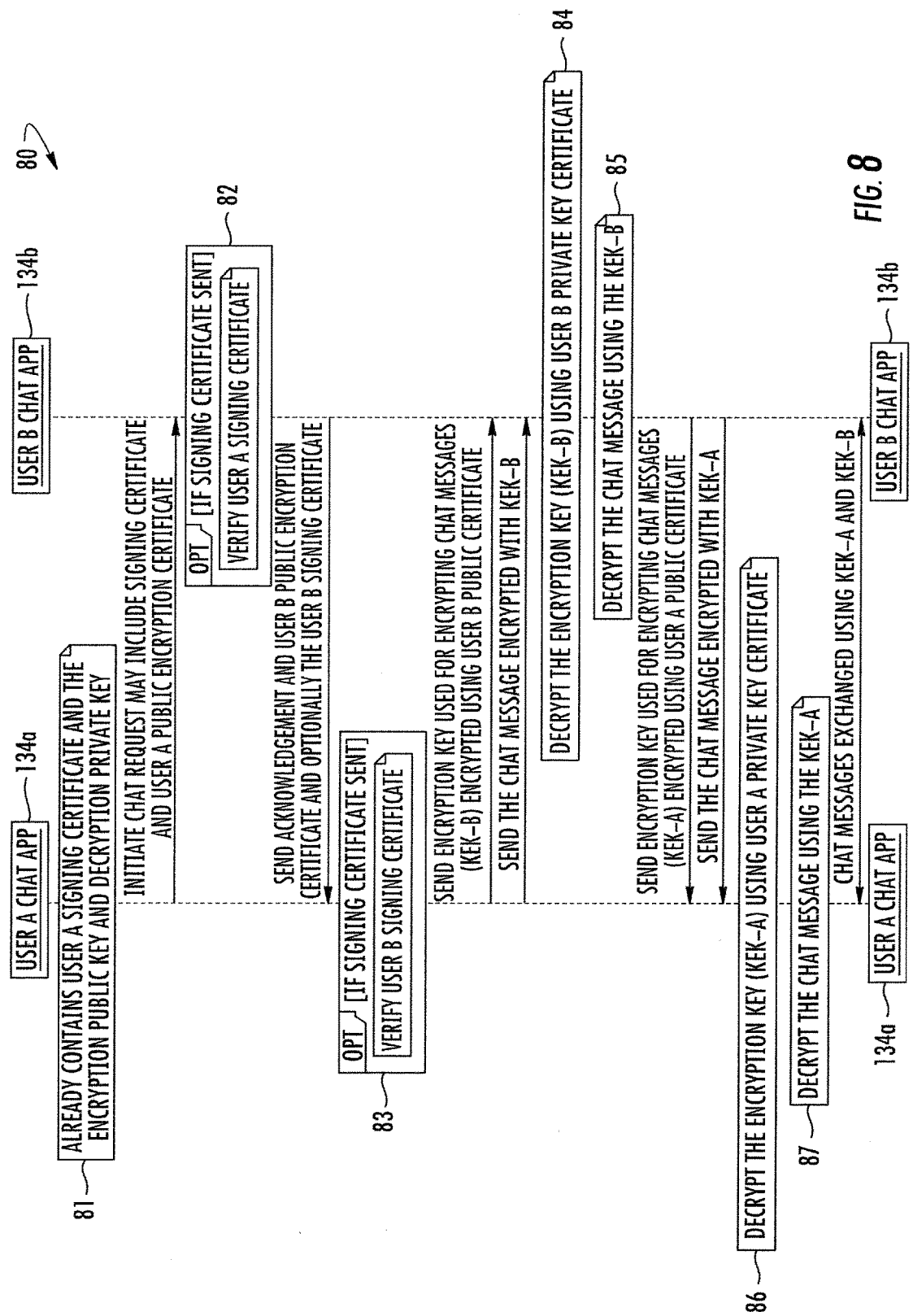
FIG. 8 is a flow diagram illustrating an example implementation of the system of FIG. 5 which utilizes digital certificates associated with an email app to also enable secure end-to-end encryption of chat data.

Further details regarding how the above-described three PKI components may be used are now provided with reference to an example implementation illustrated in the flow diagram 80 FIG. 8. Here, User A and User B both have respective mobile devices which has been enrolled with an EMM system, each of which runs a respective chat app 134*a*, 134*b* thereon. User A's mobile device (and/or smart card) already has its respective signing certificate, encryption public key and decryption private key assigned thereto, as discussed above, at Block 81. The chat app 134*a* initiates a chat request to User B and the chat app 134*b* including the public encryption and (optionally) signing certificates associated with User A. If the signing certificate is included, the chat app 134*b* may verify User A's signing certificate with the appropriate certifying authority, at Block 82. The chat app 134*b* may further send an acknowledgement back to the chat app 134*a*, along with User B's public encryption certificate and (optionally) signing certificate.

If the signing certificate is included with User B's response, the chat app 134*a* may similarly verify User B's signing certificate with the appropriate certifying authority, at Block 83. The chat app 134*a* may then send an encryption key used for encrypting chat messages (KEK-B), which is encrypted using User B's public certificate. The chat app 134*a* further sends the chat message to the chat app 134*b*, which is encrypted using the encryption key KEK-B. The chat app 134*b* decrypts the encryption key KEK-B using User B's private key certificate, at Block 84, and may then decrypt the chat message using the key KEK-B, at Block 85.

The chat app 134*b* may then send an encryption key that it uses for encrypting chat messages (KEK-A), which is encrypted using User A's public certificate, followed by a chat message encrypted with the key KEK-A. As such, the chat app 134*a* decrypts the encryption key KEK-A using User A's private key certificate, at Block 86, and may then decrypt the chat message using the key KEK-B, at Block 87. At this point, the chat apps 134*a*, 134*b* are now configured to send encrypted chat messages between one another using the exchanged keys KEK-A and KEK-B. As note above, these chat messages are not viewable by the intermediate EMM system or server (i.e., these messages are opaque to the server).

It should be noted that the separate keys KEK-A and KEK-B need not be used in all embodiments. For example, the chat messages could be encrypted using the public key associated with the other user (e.g., chap app 134*a* uses User B's public certificate to encrypt chat messages, and vice-versa). Exchange of the keys KEK-A and KEK-B provides another optional layer of security.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile device comprising:
   at least one memory and a processor cooperating with the at least one memory to
   enroll with an enterprise mobility management (EMM) server and store a plurality of different managed enterprise applications in the at least one memory,
   receive and store a digital certificate associated with a given one of the managed enterprise applications in a secure shared location within the at least one memory, and
   run the plurality of managed enterprise applications to share access to the digital certificate from the secure shared location and generate and send encrypted data to another mobile device via the EMM server with all of the managed enterprise applications using the same digital certificate associated with the given managed enterprise application for encryption so that the EMM server is unable to decrypt the encrypted data.

2. The mobile device of claim 1 wherein one of the plurality of managed enterprise applications comprises a chat application to generate encrypted chat data.

3. The mobile device of claim 1 wherein one of the plurality of managed enterprise applications comprises an electronic mail (email) application to generate encrypted email data.

4. The mobile device of claim 1 wherein one of the plurality of managed enterprise applications comprises a video streaming application to generate encrypted video streaming data.

5. The mobile device of claim 1 wherein the plurality of managed enterprise applications are stored in a secure container.

6. The mobile device of claim 1 wherein the digital certificate comprises at least one public key server (PKS) certificate.

7. The mobile device of claim 1 wherein the digital certificate comprises a Secure/Multipurpose Internet Mail Extensions (S/MIME) certificate.

8. The mobile device of claim 1 wherein the at least one memory and processor further cooperate to receive and store the digital certificate via electronic mail delivery.

9. The mobile device of claim 1 wherein the at least one memory and processor further cooperate to receive and store the digital certificate as a derived credential.

10. The mobile device of claim 1 wherein a smart card is associated with the mobile device; and wherein the at least one memory and processor further cooperate to receive and store the digital certificate via the respective smart card.

11. A method comprising:
    enrolling a mobile device with an enterprise mobility management (EMM) server and storing a plurality of different managed enterprise applications in at least one memory of the mobile device;

receiving and storing a digital certificate associated with a given one of the managed enterprise applications in a secure shared location within the at least one memory; and running the plurality of managed enterprise applications to access the digital certificate from the secure shared location and generate and send encrypted data to another mobile device via the EMM server with all of the managed enterprise applications using the same digital certificate associated with the given managed enterprise application for encryption so that the EMM server is unable to decrypt the encrypted data.

12. The method of claim 11 wherein the given managed enterprise application comprises an electronic mail (email) application to generate encrypted email data.

13. The method of claim 11 wherein one of the plurality of managed enterprise applications comprises a video streaming application to generate encrypted video streaming data.

14. The method of claim 11 wherein storing comprises storing the plurality of managed enterprise applications in a secure container.

15. The method of claim 11 wherein the digital certificate comprises at least one of a public key server (PKS) certificate and a Secure/Multipurpose Internet Mail Extensions (S/MIME) certificate.

16. A non-transitory computer-readable medium for a mobile device comprising at least one memory and having computer executable instructions for causing the mobile device to perform steps comprising:

enrolling with an enterprise mobility management (EMM) server and storing a plurality of different managed enterprise applications in the at least one memory;

receiving and storing a digital certificate associated with a given one of the managed enterprise applications in a secure shared location within the at least one memory; and running the plurality of managed enterprise applications to access the digital certificate from the secure shared location and generate and send encrypted data to another mobile device via the EMM server with all of the managed enterprise applications using the same digital certificate associated with the given managed enterprise application for encryption so that the EMM server is unable to decrypt the encrypted data.

17. The non-transitory computer-readable medium of claim 16 wherein the given managed enterprise application comprises an electronic mail (email) application to generate encrypted email data.

18. The non-transitory computer-readable medium of claim 16 wherein one of the plurality of managed enterprise applications comprises a video streaming application to generate encrypted video streaming data.

19. The non-transitory computer-readable medium of claim 16 wherein storing comprises storing the plurality of managed enterprise applications in a secure container.

20. The non-transitory computer-readable medium of claim 16 wherein the digital certificate comprises at least one of a public key server (PKS) certificate and a Secure/Multipurpose Internet Mail Extensions (S/MIME) certificate.

* * * * *